(12) United States Patent
Goad et al.

(10) Patent No.: US 7,111,497 B2
(45) Date of Patent: Sep. 26, 2006

(54) LEAK DETECTION APPARATUS FOR LINED VESSELS AND METHOD OF USE

(75) Inventors: Curtis Goad, Ellisville, MO (US); James R. Carl, Houston, TX (US); Fred Dyer, Newport News, VA (US)

(73) Assignee: Tankinsight, LLC, Ellisville, MO (US)

( * ) Notice: Subject to any disclaimer, the term of this patent is extended or adjusted under 35 U.S.C. 154(b) by 0 days.

(21) Appl. No.: 10/787,339

(22) Filed: Feb. 26, 2004

(65) Prior Publication Data

US 2005/0188750 A1   Sep. 1, 2005

(51) Int. Cl.
*G01M 3/16* (2006.01)
*G01M 3/40* (2006.01)

(52) U.S. Cl. .......................... 73/40; 73/49.2; 73/49.3; 73/52

(58) Field of Classification Search ................ 73/40, 73/49.2, 49.3, 49.8, 52, 866.5; 324/444, 324/445, 557, 558, 559, 263, 552
See application file for complete search history.

(56) References Cited

U.S. PATENT DOCUMENTS

| 2,832,046 | A | * | 4/1958  | Rezek ........................ 324/445 |
| 4,543,525 | A | * | 9/1985  | Boryta et al. ................ 324/559 |
| 4,619,740 | A |   | 10/1986 | Nitsche et al. |
| 4,644,285 | A |   | 2/1987  | Britton |
| 4,720,669 | A |   | 1/1988  | Owen |
| 4,725,785 | A | * | 2/1988  | Converse et al. ............ 324/559 |
| 4,740,757 | A | * | 4/1988  | Converse et al. ............ 324/559 |
| 4,950,374 | A | * | 8/1990  | Darilek et al. ............... 204/479 |
| 5,184,083 | A | * | 2/1993  | Groover ...................... 324/559 |
| 5,202,638 | A | * | 4/1993  | Kolz .......................... 324/444 |
| 5,214,387 | A |   | 5/1993  | Fenner |
| 5,378,991 | A |   | 1/1995  | Anderson et al. |
| 5,640,096 | A | * | 6/1997  | Alm ............................. 73/40 |
| 6,662,632 | B1| * | 12/2003 | Parker et al. .................. 73/40 |

OTHER PUBLICATIONS

MSD Materials Selection & Design Preleak Detection Systems for Dual Laminate Equipment—A User's Perspective 84 Materials Performance Sep. 2000—*Internet Web pp.* (1-5).
Carmagen Engineering Report Holiday Detection in Aboveground Storage Tank Bottom Lining Inspection By John F. Delahunt—*Internet Web pp.* (1-2).

(Continued)

*Primary Examiner*—Hezron Williams
*Assistant Examiner*—David A. Rogers
(74) *Attorney, Agent, or Firm*—Polster, Lieder, Woodruff & Lucchesi, L.C.

(57) ABSTRACT

A leak detection apparatus detects leaks or premature wearing in a lined fluid filled vessel. A leak detection apparatus comprises a current density meter, a power supply, and a probe. The probe is inserted into the fluid filled vessel. The power supply supplies an AC or DC electric current to a directional amplifier of the probe. A torroid of the probe senses the current density in the fluid and sends an electrical signal to the current density meter. The current density meter measures the electrical signal and communicates a current density readout to a display. This readout indicates to an operator whether or not there is a crack, premature wearing, or a bypass.

25 Claims, 3 Drawing Sheets

OTHER PUBLICATIONS

Depth of Penetration & Current Density http://www.ndt-ed.org/EducationResources/CommunityCollege/EddyCurrents/Physics/depthcurrentdensity.htm—*Internet Web pp.* (1-7).

New Product in Development L.M.S. "Linear Monitoring System" (Brochure) Omni Services, Inc.

Quality Rubber and Corrosion Proof Linings for Pipes-Tanks-Valves Vessels and Associated Equipment Food Processing Applications (Brochure).

Instruction Manual Absolute Current Density Meter Model CD-300 Revised Jul. 2002 Industrial Instruments, Inc.

* cited by examiner

LEAK DETECTION APPARATUS FOR LINED VESSELS AND METHOD OF USE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

Storing and transporting hazardous fluids in vessels can be a dangerous business. Hazardous fluids are often extremely corrosive causing vessel interiors to deteriorate very rapidly. To slow the deterioration, many vessel interiors are coated with a non-corrosive lining, such as Teflon, Rubber, Fiberglass Reinforced Plastic, and others. Even with the use of non-corrosive linings, all vessels eventually wear and deteriorate ultimately producing cracks that can leak hazardous fluid into the environment. In addition to harming the environment, these leaks can be violations of the law. In an effort to protect the environment and follow the law, an entire industry has developed creative technology to detect and prevent leaks in these vessels. While some of this technology has been successful in detecting leaks, it has also proven to be expensive, labor-intensive, and sometimes unreliable.

One popular method for detecting leaks in a vessel is Holiday spark testing. This method comes in two varieties, low-voltage and high-voltage. Using the low voltage method, a ground wire and a lead wire are connected to a low-voltage battery. The ground wire is connected to the outside of a vessel and the lead wire is connected to a wet sponge. In operation, the wet sponge is moved over the non-corrosive lining. If there is a crack in the lining, the circuit is completed activating an audible or visual indicator.

While this device is inexpensive and relatively easy to use, it has drawbacks. First, the vessel in service must be completely empty of fluid and dry before spark testing can begin due to safety and operational concerns. This has a number of consequences. If not completely dry, any remaining fluid in the vessel can cause a short and falsely indicate a crack or the wrong location. Even worse, if the vessel contained flammable fluids there is the risk of igniting the remaining fluid. Another consequence of removing the fluid from the tank is that some cracks may become undetectable with the fluid removed.

When a vessel is filled with fluid, the pressure exerted on the vessel by the specific gravity and temperature of the fluid can enlarge cracks that otherwise shrink and disappear when the fluid is removed and the pressure is relieved. A second drawback of low-voltage testing is that spark testing is not sensitive enough to indicate inadequate thickness in the tank lining, which leads to premature failure of the lining. Third, locating a crack in the lining with this device is very time consuming. To operate a spark tester, an operator must manually sweep the spark tester over the entire lining of the tank. Not only is this process time consuming, but it also requires a degree of skill and experience from the operator. Finally, this method is not capable of early detection of weakness in the lining, such as thinning. It only detects weaknesses that have developed into full-fledged cracks. As a result, spark testing must be routinely performed to detect cracks quickly after they develop to prevent leaking. All of these disadvantages result in high maintenance and repair costs along with loss of production time.

High-voltage spark testing is very similar to low-voltage spark testing, except an electrode is used instead of a wet sponge and a high-voltage power source is used instead of a low-voltage battery. When a crack in the lining is detected, an electrical arc is visible between the electrode and the lining. The electrical arc acts as a visual indicator of a crack in the lining. The high-voltage power source allows this method to indicate inadequate thickness in the tank lining. Like low-voltage spark testing, the tank must be empty of fluid and dry. This method has all the same drawbacks as low-voltage spark testing. In fact, there is an increased risk of igniting residual flammable fluids. Additionally, repeated high-voltage spark testing leads to breakdown of the lining. Again, these disadvantages result in high maintenance and repair costs along with loss of production time.

Other methods for detecting leaks allow for continuous testing while the vessel is still filled with fluid. One such method is specifically described in U.S. Pat. No. 5,214,387, hereafter referred to as '387. Multiple probes are embedded in a vessel wall at various depths. A separate probe is submerged in the fluid within the vessel. An electrical monitor connected to all the probes communicates an electrical signal through the submerged probe into the fluid. If a crack in the vessel lining develops, fluid will penetrate the crack and contact the probes in the vessel wall, thus, completing an electrical circuit. The electrical monitor registers this signal and activates an audible or visible indicator.

However, there are numerous problems with this method of leak detection. First, the ability to detect leaks is dependent on the number and placement of the probes. Therefore, leaks that develop in an area not monitored by a probe may never be detected. To address this concern, '387, discloses a mat built within the entire structure of the vessel. However, this only results in another problem. A mat will detect a leak anywhere in the vessel, but will not indicate exactly where the leak is located. Consequently, Holiday spark testing must be subsequently performed to identify the actual location of the leak. A second problem with this method is contamination and corrosion of the probes. When this happens, the probes become ineffective preventing detection of leaks. These problems can result in the non-detection or late detection of a leak resulting in increased expenses for maintenance and repair.

Another method for continuous testing while the vessel is still filled with fluid is specifically described in U.S. Pat. No. 5,378,991, hereafter referred to as '991. In this method, the vessel has an inner conductive layer. It also has a probe that is submerged in the fluid. An electrical monitor connected to the inner conductive layer communicates an electrical signal through the submerged probe into the fluid. If a crack in the vessel lining develops, fluid will penetrate the crack and contact the inner conductive layer, thus, completing an electrical circuit. The electrical monitor registers this signal and activates an audible or visible indicator.

However, the problems with this method of leak detection are similar to the method in '387. First, the inner conductive layer will detect any leak present in the vessel, but will not indicate exactly where the leak is located. Consequently, Holiday spark testing must be subsequently performed to identify the actual location of the leak. A second problem with this method is contamination and corrosion of the probe. When this happens, the probe becomes ineffective preventing detection of leaks. These problems can result in the non-detection or late detection of a leak resulting in increased expenses for maintenance and repair.

Fortunately, the present invention overcomes the problems associated with methods described above. Using the present invention, both leaks and premature wearing can be detected while a vessel is filled with fluid, preventing high maintenance costs along with lost production time. In addition, the present invention specifically pinpoints the location of leaks in a vessel.

BRIEF SUMMARY OF THE INVENTION

Briefly stated, a first embodiment of the invention is a leak detection apparatus comprising a power supply that supplies an electric current to a probe. The probe supplies the electric current to the fluid of a fluid-filled vessel, and senses current density to communicate an electrical signal to a current density meter. The current density meter measures the electrical signal and communicates a current density reading.

A second embodiment of the invention is a leak detection apparatus comprising an integrated power supply and current density meter that supplies an electric current to a probe. The probe emits an electrical signal to a fluid-filled vessel and senses current density to communicate an electrical signal to the integrated power supply and current density meter. The integrated power supply and current density meter measures the electrical signal and communicates a current density reading.

A first method of use comprises the steps of inserting a probe into a fluid-filled vessel and communicating an electric current from a power supply to the probe. The probe senses a current density and communicates an electrical signal from the probe to a current density meter. The current density meter measures the electrical signal and determines a current density reading. The current density reading is communicated to an operator.

A second method of use comprises the steps of inserting a directional amplifier into a fluid-filled vessel and inserting a torroid into the fluid-filled vessel. A power supply communicates an electric current to the directional amplifier. The torroid senses a current density and communicates an electric signal to a current density meter. The current density meter measures the electric signal and determines a current density reading. The current density reading is communicated to an operator.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
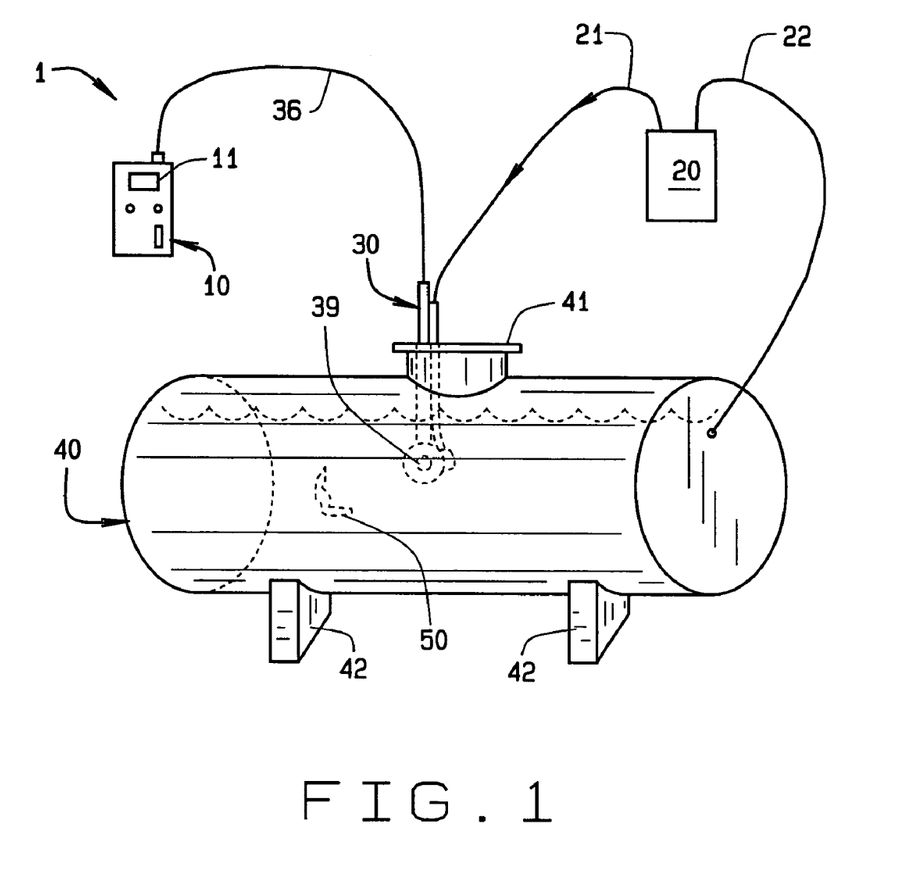
FIG. 1 is a perspective view of a first embodiment of a leak detection apparatus inspecting a tank.

As shown in FIG. 1, a first embodiment of a leak detection apparatus 1 comprises a current density meter 10, a power supply 20, and a probe 30. The current density meter 10 is a readily available device, such as the Model CD-300 sold by Industrial Instruments, Inc., 446 Winterhaven. Dr., Newport News, Va. 23606. The current density meter 10 receives an electrical signal representing current density for measurement. Using the electrical signal, the meter 10 measures and communicates a current density reading to a display 11 in the units of $Amp/ft^2$. The Model CD-300 is sensitive enough to measure current density in a range of 0.1 $Amp/ft^2$ to 1999 $Amp/ft^2$. Although FIG. 1 discloses the current density meter 10 as the Model CD-300, other types of current density meters can be substituted to achieve varying ranges of sensitivity.

The power supply 20 is a readily available device, such as 6-volt power supply. The power supply 20 includes a power wire 21 for supplying an electrical current and a ground wire 22 for electrical grounding. The electrical current supplied by the power supply 20 can be either an AC or DC current in a range capable of measurement by the current density meter 10.

While FIG. 1 discloses a separate power supply 20 and current density meter 10, those skilled in the art will recognize that the power supply 20 and meter 10 can be combined into a single device.

Figures 2A, 2B:
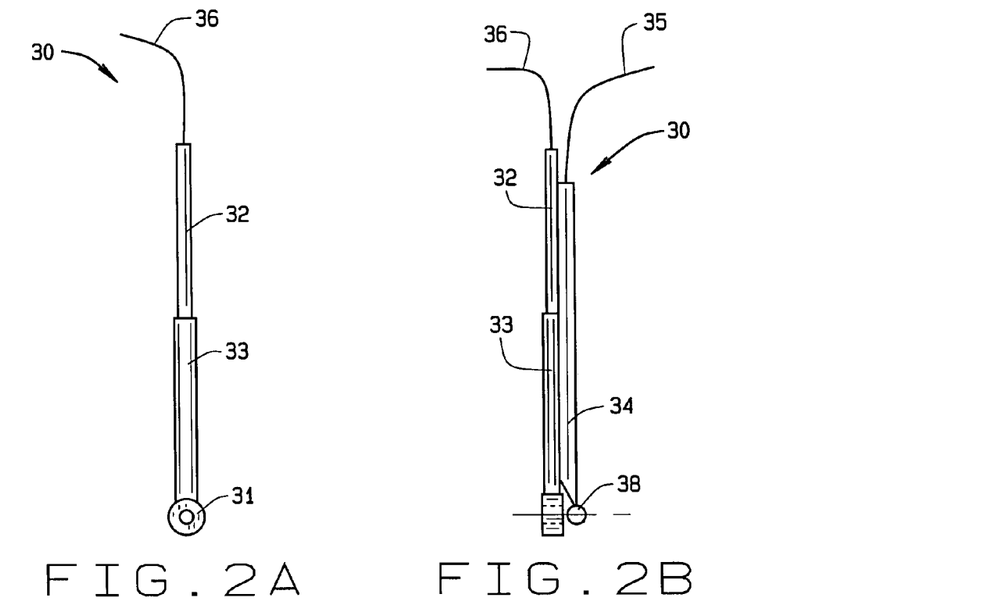
FIG. 2A is a front view of a first embodiment of a probe.
FIG. 2B is a side view of a first embodiment of a probe.
Figure 3A:
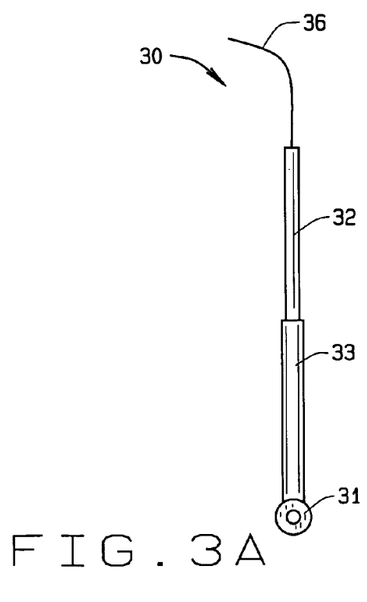
FIG. 3A is a front view of a second embodiment of a probe.
Figure 3B:
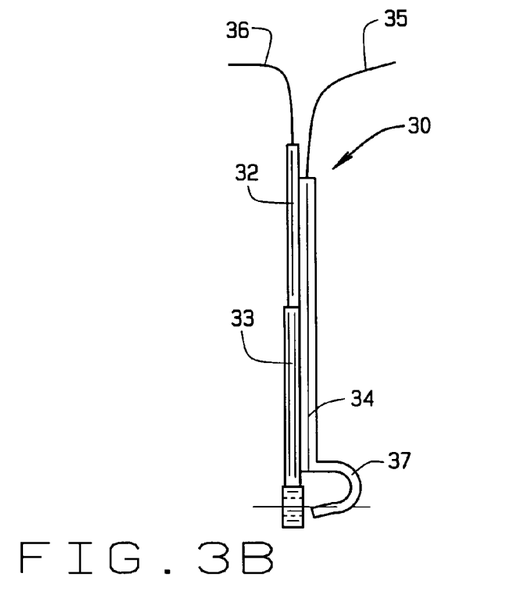
FIG. 3B is a side view of a second embodiment of a probe.

As shown in FIGS. 2 and 3, the probe 30 comprises a torroid 31, a handle 32, a protective coating 33, a directional amplifier 34, and an output wire 36. The torroid 31 is a ferromagnetic ring for sensing current density. It is electrically connected to the current density meter 10 by the output wire 36. The handle 32 is a rod for supporting the torroid 31. The torroid 31 is affixed to the end of the handle 32. The torroid 31 and handle 32 are covered by a protective coating 33. The protective coating 33 is a chemically resistant coating that protects the torroid 31 and handle 32 from the corrosive chemicals to which the probe 30 is exposed during operation. The protective coating 33 can comprise any appropriate material, such as a non-corrosive polymer.

As shown in FIG. 2B, a first embodiment of the directional amplifier 34 is a rod with a ball 38 affixed to the end. The amplifier 34 is affixed to the handle 32 so that the center of the ball 38 is aligned with the centerline of the torroid 31 at an effective distance. The effective distance from the torroid 31 is a distance that maximizes the reading of current density by the current density meter 10. The amplifier 34 is electrically connected to the power supply 20 via the power wire 21 for receiving an electrical current.

As shown in FIG. 3B, a second embodiment of the directional amplifier 34 is a rod with a C-shaped end 37. The amplifier 34 is affixed to the handle 32 so that the tip of the C-shaped end 37 is aligned with the centerline of the torroid 31 at an effective distance. The effective distance from the torroid 31 is a distance that maximizes the measurement of current density by the current density meter 10. The amplifier 34 is electrically connected to the power supply 20 via the power wire 21 for receiving an electrical current.

While FIGS. 2 and 3 disclose a first and second embodiment of the directional amplifier 34, other shapes and sizes may be used to maximize the reading of current density by the current density meter 10. In addition, the amplifier 34 may be made from any applicable conductive material.

In operation, the probe 30 is inserted into an opening 41 of a fluid filled vessel 40 with a non-conductive lining. The power supply 20 outputs an electrical current through the power wire 21 to the directional amplifier 34 of the probe 30. The electrical current flows from the directional amplifier 34 into the fluid in the vessel. An operator directs the probe 30 to any area where a crack 50 or premature wearing in the lining is suspected so that a bore 39 of the torroid 31 and directional amplifier 34 point at the suspected crack 50 or premature wearing. When a crack 50 or premature wearing is present, a conductive path is present which attracts the electrical current flowing from the directional amplifier 34, resulting in an increase in the current density around the crack 50 or premature wearing. The torroid 31 senses this increase in current density and sends a corresponding electrical signal to the current density meter 10. Therefore, if a crack or premature wearing is present, the current density reading communicated by the current density meter 10 will be very high, such as about 3,000–6,000 mA, assuming a 6-volt electrical current output from the power supply 20. However, if no crack 50 or premature wearing is present there is no conductive path and the current density reading will be very low, such as about 0–1000 mA. Therefore, the present invention can pinpoint the location of cracks and premature wearing in a fluid-filled vessel before any leaks occur. It should be noted that the high and low ranges described here are merely exemplary and can vary with different power supplies, vessels, fluids, directional amplifiers, temperatures, and other conditions.

A very high current density reading may also indicate a bypass. A bypass is a conductive path in the vessel other than a crack or premature wearing. This is usually caused by faulty insulators within the vessel. An operator using the leak detection apparatus 1 can distinguish between a crack 50 and a bypass by observing where the probe is pointed in conjunction with the readings from the meter 10. If the meter 10 communicates a high current density reading while the probe 30 is pointed at an insulator, the meter 10 is most likely indicating a bypass. If the probe 30 is pointed at a lined vessel wall and the meter 10 is showing a high reading, there is most likely a crack 50 or premature wearing of the lining.

Figure 4:
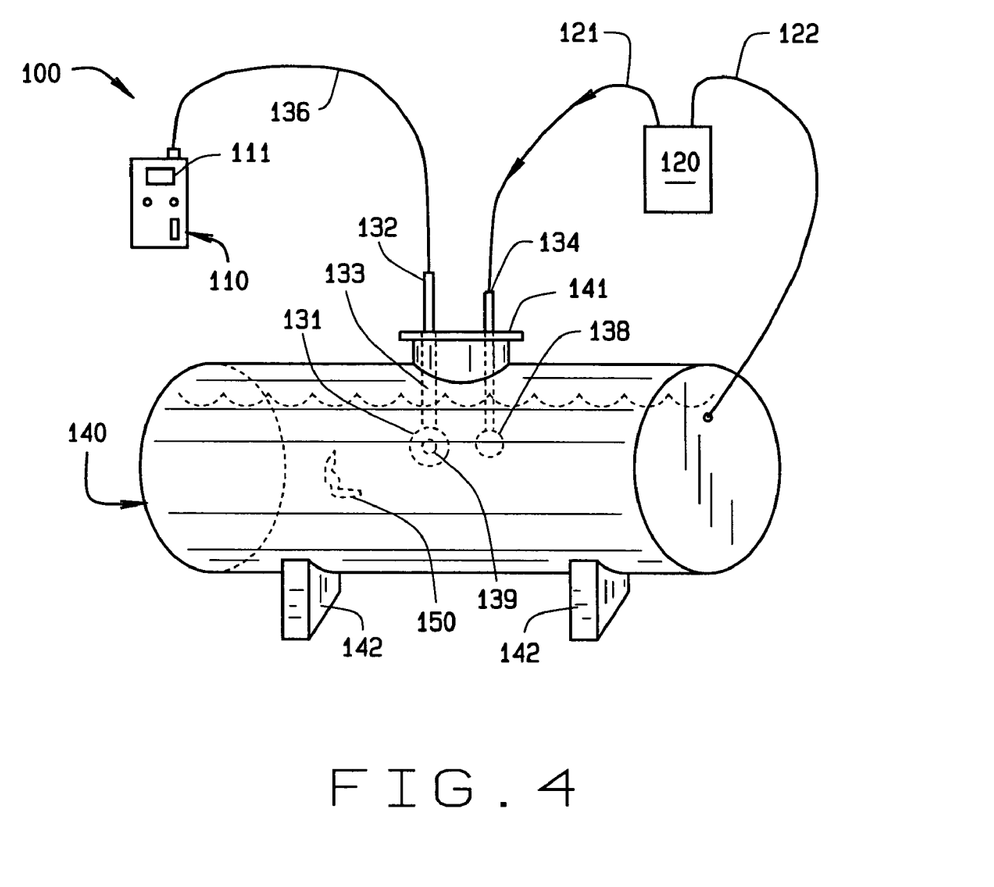
FIG. 4 is a perspective view of a second embodiment of a leak detection apparatus inspecting a tank.

FIG. 4 illustrates a second embodiment of a leak detection apparatus 100. It is important to note that while the first embodiment operates by maximizing a current density reading to locate the cracks, the second embodiment operates by minimizing a current density reading to locate a cracks. The second embodiment of a leak detection apparatus 100 comprises a current density meter 110, a power supply 120, a torroid 131, and a directional amplifier 134. In the second embodiment, the torroid 131 and directional amplifier 134 are not attached to form a single probe 30 as in the first embodiment. Instead, the torroid 131 and directional amplifier 134 remain independent.

The current density meter 110 is a readily available device, such as the Model CD-300 sold by Industrial Instruments, Inc., 446 Winterhaven Dr., Newport News, Va. 23606. The current density meter 110 receives an electrical signal representing current density for measurement. Using the electrical signal, the meter 110 measures and communicates a current density reading to a display 111 in the units of Amp/ft$^2$. The Model CD-300 is sensitive enough to measure current density in a range of 0.1 Amp/ft$^2$ to 1999 Amp/ft$^2$. Although FIG. 4 discloses the current density meter 110 as the Model CD-300, other types of current density meters can be substituted to achieve varying ranges of sensitivity.

The power supply 120 is a readily available device, such as 6-volt power supply. The power supply 120 includes a power wire 121 for supplying an electrical current and a ground wire 122 for electrical grounding. The electrical current supplied by the power supply 120 can be either an AC or DC current in a range capable of measurement by the current density meter 110.

As shown in FIG. 4, the torroid 131 further comprises, a handle 132, a protective coating 133, and an output wire 136. The torroid 131 is a ferromagnetic ring for sensing current density. It is electrically connected to the current density meter 110 by the output wire 136. The handle 132 is a rod for supporting the torroid 131. The torroid 131 is affixed to the end of the handle 132. The torroid 131 and handle 132 are covered by a protective coating 133. The protective coating 133 is a chemically resistant coating that protects the torroid 131 and handle 132 from the corrosive chemicals to which they are exposed during operation. The protective coating 133 can comprise any appropriate material, such as a non-corrosive polymer.

The directional amplifier 134 is a rod with a ball 138 affixed to the end. The amplifier 134 is electrically connected to the power supply 120 via the power wire 121 for receiving an electrical current. Those of ordinary skill in the art will recognize that other shapes and sizes may be used to minimize the reading of current density by the current density meter 110. In addition, the amplifier 134 may be made from any applicable conductive material.

In operation, the torroid 131 and directional amplifier 134 are both inserted into an opening 141 of a fluid filled vessel 140 with a non-conductive lining. The power supply 120 outputs an electrical current through the power wire 121 to the directional amplifier 134. The electrical current flows from the directional amplifier 134 into the fluid in the vessel. An operator directs the torroid 131 to any area where a crack 50 or premature wearing in the lining is suspected so that a bore 139 of the torroid 131 aligns perpendicularly with the suspected crack 150 or premature wearing. When a crack 150 or premature wearing is present, a conductive path is present which attracts the electrical current flowing from the directional amplifier 134. A torroid 131 placed perpendicular to the crack 150 is also perpendicular to the flow of current to the crack 150. Consequently, the presence of a crack reduces the torroid's ability to sense current density. As a result, the torroid 131 sends a corresponding electrical signal to the current density meter 10. Therefore, if a crack or premature wearing is present, the current density reading communicated by the current density meter 110 will be very low, such as about 0–1000 mA, assuming a 6-volt electrical current output from the power supply 20. However, if no crack 150 or premature wearing is present there is no conductive path and the current density reading will be very high. Therefore, the present invention can pinpoint the location of cracks and premature wearing in a fluid-filled vessel before any leaks occur. It should be noted that the high and low ranges described here are merely exemplary and can vary with different power supplies, vessels, fluids, directional amplifiers, temperatures, and other conditions.

Changes can be made in the above constructions without departing from the scope of the invention, it is intended that all matter contained in the above description or shown in the accompanying drawings shall be interpreted as illustrative and not in a limiting sense.

What is claimed is:

1. A leak detection apparatus comprising:
   a power supply for supplying an electrical current;
   a probe having a directional amplifier electrically connected to the power supply for receiving the electric current, the directional amplifier emitting the electric current to fluid in a fluid-filled vessel, and a torroid for sensing current density in the fluid to communicate an electrical signal; and
   a current density meter electrically connected to the probe for receiving the electrical signal, the current density meter measuring the electrical signal to communicate a current density reading.

2. The leak detection apparatus of claim 1 wherein the electric current supplied by the power supply is a DC current.

3. The leak detection apparatus of claim 1 wherein the electric current supplied by the power supply is an AC current.

4. The leak detection apparatus of claim 1 wherein the probe comprises:
   a handle affixed to the directional amplifier and the torroid; and
   a protective coating covering the handle and torroid for protection from corrosive fluids.

5. The leak detection apparatus of claim 4 wherein the directional amplifier comprises a rod with a C-shaped end so that a tip of the C-shaped end is aligned with a centerline of the torroid at an effective distance.

6. The leak detection apparatus of claim 4 wherein the directional amplifier comprises a rod with a ball affixed to the end so that the center of the ball is aligned with the centerline of the torroid at an effective distance.

7. The leak detection apparatus of claim 4 wherein the directional amplifier comprises means for maximizing the reading of current density by the current density meter.

8. A leak detection apparatus comprising:
   an integrated power supply and current density meter for supplying an electric current, and for receiving and measuring an electrical signal for communicating a current density reading; and
   a probe electrically connected to the integrated power supply and current density meter for receiving electric current, the probe having a directional amplifier for emitting electrical current to fluid of a fluid-filled vessel, and torroid for sensing current density and communicating the electrical signal to the integrated power supply and current density meter.

9. The leak detection apparatus of claim 8 wherein the probe comprises:
   a handle affixed to the directional amplifier and torroid; and
   a protective coating covering the handle and torroid for protection from corrosive fluids.

10. The leak detection apparatus of claim 8 wherein the directional amplifier comprises a rod with a C-shaped end so that a tip of the C-shaped end is aligned with a centerline of the torroid at an effective distance.

11. The leak detection apparatus of claim 8 wherein the directional amplifier comprises a rod with a ball affixed to the end so that the center of the ball is aligned with the centerline of the torroid at an effective distance.

12. The leak detection apparatus of claim 8 wherein the directional amplifier comprises means for maximizing the reading of current density by the current density meter when the probe is pointed at a crack.

13. The leak detection apparatus of claim 8 wherein the electric current supplied by the power supply is a DC current.

14. The leak detection apparatus of claim 8 wherein the electric current supplied by the power supply is an AC current.

15. A method of leak detection comprising the steps of:
   inserting a probe into a fluid filled vessel;
   the probe comprising a directional amplifier and a torroid;
   communicating an electric current from a power supply to the directional amplifier;
   communicating the electric current from the directional amplifier to a fluid of the fluid-filled vessel;
   sensing a current density with the torroid;
   communicating an electrical signal from the torroid to a current density meter;
   measuring the electrical signal from the torroid to determine a current density reading; and
   communicating the current density reading to an operator.

16. A leak detection apparatus comprising:
   a power supply for supplying an electrical current;
   a directional amplifier electrically connected to the power supply for receiving the electric current, the directional amplifier emitting the electric current to fluid in a fluid-filled vessel;
   a torroid for sensing current density in the fluid to communicate an electrical signal; and
   a current density meter electrically connected to the torroid for receiving the electrical signal, the current density meter measuring the electrical signal to communicate a current density reading.

17. The leak detection apparatus of claim 16 further comprising:
   a handle affixed to the torroid; and
   a protective coating covering the handle and torroid for protection from corrosive fluids.

18. The leak detection apparatus of claim 16 wherein the directional amplifier comprises a rod with a ball affixed to the end.

19. The leak detection apparatus of claim 16 wherein the directional amplifier comprises means for minimizing the reading of current density by the current density meter when the torroid is perpendicular to a crack.

20. The leak detection apparatus of claim 16 wherein the electric current supplied by the power supply is a DC current.

21. The leak detection apparatus of claim 16 wherein the electric current supplied by the power supply is an AC current.

22. A method of leak detection comprising the steps of:
   inserting a directional amplifier into a fluid filled vessel;
   inserting a torroid into the fluid filled vessel;
   communicating an electric current from a power supply to the directional amplifier;
   sensing a current density with the torroid;
   communicating an electrical signal from the torroid to a current density meter;
   measuring the electrical signal from the torroid to determine a current density reading;
   communicating the current density reading to an operator.

23. The leak detection apparatus of claim 16 wherein the directional amplifier comprises a rod with a C-shaped end so that a tip of the C-shaped end is aligned with a centerline of the torroid at an effective distance.

24. The method of leak detection of claim 22 wherein the directional amplifier comprises a rod with a C-shaped end so that a tip of the C-shaped end is aligned with a centerline of the torroid at an effective distance.

25. The method of leak detection of claim 22 wherein the directional amplifier comprises a rod with a ball affixed to the end.

* * * * *

UNITED STATES PATENT AND TRADEMARK OFFICE
CERTIFICATE OF CORRECTION

PATENT NO.       : 7,111,497 B2                              Page 1 of 1
APPLICATION NO.  : 10/787339
DATED            : September 26, 2006
INVENTOR(S)      : Goad et al.

It is certified that error appears in the above-identified patent and that said Letters Patent is hereby corrected as shown below:

Col. 7, Line 39

After the word "meter" and before the period (.)
Please insert the words -- when the probe is pointed at a crack--

Signed and Sealed this

Sixteenth Day of January, 2007

JON W. DUDAS
*Director of the United States Patent and Trademark Office*